United States Patent [19]

Nishino et al.

[11] Patent Number: 4,640,950
[45] Date of Patent: Feb. 3, 1987

[54] THIXOTROPIC POLYURETHANE RESIN COMPOSITIONS

[75] Inventors: Kenichi Nishino, Ibaraki; Atsuo Kobayashi, Nishinomiya; Sachio Higashi, Suita; Shinichiro Yamamoto, Hikami; Kiyoshi Yasuda, Ikeda, all of Japan

[73] Assignee: Takeda Chemical Industries, Ltd., Osaka, Japan

[21] Appl. No.: 797,031

[22] Filed: Nov. 12, 1985

Related U.S. Application Data

[63] Continuation-in-part of Ser. No. 620,051, Jun. 12, 1984, abandoned, and a continuation-in-part of Ser. No. 743,367, Jun. 11, 1985, abandoned.

[30] Foreign Application Priority Data

Jun. 22, 1983 [JP] Japan .................. 58-113383
Jun. 12, 1984 [JP] Japan .................. 59-121099

[51] Int. Cl.$^4$ ............................................ C08K 3/36
[52] U.S. Cl. ................................ 524/265; 524/500; 524/731; 524/871; 524/872; 524/873; 524/875

[58] Field of Search ............. 524/265, 731, 500, 871, 524/872, 873, 875

[56] References Cited

U.S. PATENT DOCUMENTS

| | | | |
|---|---|---|---|
| 3,585,230 | 6/1971 | Woycheshin et al. | 524/731 |
| 3,607,822 | 9/1971 | Nishino | 528/44 |
| 3,923,926 | 12/1975 | Harada et al. | 528/48 |
| 4,011,189 | 3/1977 | Keil | 524/731 |
| 4,195,009 | 3/1980 | Zimmermann | 524/731 |
| 4,528,319 | 7/1985 | Ottaviani et al. | 524/500 |

FOREIGN PATENT DOCUMENTS 59-33358 2/1984 Japan ................... 524/731

*Primary Examiner*—Lewis T. Jacobs
*Attorney, Agent, or Firm*—Wenderoth, Lind & Ponack

[57] ABSTRACT

A polyurethane resin composition which comprises (1) a polyurethane prepolymer in the form of liquid or solution, (2) colloidal silica and (3) a siloxane compound having a polyoxyethylene chain in the molecule maintains an excellent thixotropy even after solvents and additives are added and kneaded as the case may be.

6 Claims, No Drawings

THIXOTROPIC POLYURETHANE RESIN COMPOSITIONS

This is a continuation-in-part of Ser. No. 620,051, filed June 12, 1984 and Ser. No. 743,367, filed on June 11, 1985, both abandoned.

The present invention relates to novel thixotropic polyurethane resin compositions.

In recent years, polyurethanes, because of their excellent rubbery elasticity, weatherability, abrasion resistance, etc., have widely been used in a great variety of fields as elastomers, coatings, sealants, flooring materials, water-proofing materials, walling materials, synthetic or artificial leather and adhesives.

When polyurethanes are used in these application fields, they are utilized as self-levelling type resin or thixotropic resin according to their intended application fields. In particular, sealing compounds and walling materials, water proofing materials, etc. which are to be worked on vertical or slanting surfaces are used as thixotropic resins to prevent them from slumping and running.

As the method of producing such thixotropic polyurethane resin compositions, several proposals have already been made. For example, Japanese Patent Publication No. 41110/70 proposes the thixotropic polyurethane resin compositions which are obtained by combination of a polyurethane prepolymer with collidal silica and a polyoxyethylene glycol derivative; Japanese Patent Publication No. 7632/72 discloses the production of the thixotropic polyurethane resin compositions by combining a polyurethane prepolymer with a large amount of inorganic fillers and a polyoxyalkylene compound; and Japanese Patent Publication No. 11656/76 describes the preparation of the thixotropic polyurethane resin compositions by combining a polyurethane prepolymer with a block copolymer from ethylene oxide and propylene oxide and finely powdered silica, etc. Nevertheless thixotropic polyurethane resin compositions proposed so far lose their thixotropy and never restore it, when they are admixed with other components, for example, organo-metallic catalyst such as lead octylate and dibutyltin dilaureate and calcium carbonate and kneaded with a conventionally employed mixer such as three roll kneader, planetary mixer and butterfly mixer. Accordingly, when thixotropic urethane polymers or their compounded products such as one-package type sealants are produced on an industrial scale according to such methods, there have been encountered difficulties in supplying invariably stable products due to fluctuations in the product quality.

Even if a thixotropic polyurethane resin composition can once be produced by avoiding as far as possible incorporation of a component resulting in reduced thixotropy or vigorous stirring, such as composition often exhibits markedly decreased thixotropy, failing to restore the original thixotropy, when a high shear stress is applied thereon during refilling into cartridges or a hand-gun or pumping to a line gun.

In view of the above situations, the present inventors conducted intensive research in order to impart by far improved thixotropy to fluid polyurethane compositions, and as a result, found that the polyurethane resin compositions which comprise a polyurethane prepolymer in the form of liquid or solution being admixed as the essential components with colloidal silica and a siloxane compound having a polyoxyethylene chain in the molecule exhibit outstandingly excellent thixotropy. Surprisingly, the thixotropy of the polyurethane resin compositions of the present invention is not affected adversely even by addition of a solvent in a variety of kinds, plasticizers, inorganic fillers, pigments, ultraviolet absorbers, antioxidants and amines or organic metal based catalysts as conventionally used in the urethane industry and the thixotropy is in no way lost, even after such solvents and additives are added and kneaded as the case may be. In addition, it has turned out that the thixotropy to be achieved according to the present invention is not lost even after the kneading in three roll kneader, planetary mixer, vacuum kneader, butterfly mixer, etc. which are normally utilized for kneading, and that some compositions of the present invention can restore its thixotropy quickly after a high shear stress is applied to the said composition before use.

Thus, the present invention relates to the thixotropic polyurethane resin compositions which comprise a polyurethane prepolymer in the form of liquid or solution, colloidal silica and a siloxane compound having a polyoxyethylene chain in its molecule.

The polyurethane prepolymer which is one of the basic materials in the present composition includes polymers having a relatively low molecular weight, which have an average molecular weight ranging from about 500 to about 10,000, formed by polymerization of polyisocyanates and active hydrogen compounds to be described hereinafter at the equivalent ratio of NCO group to active hydrogen group ranging preferably from 1.02:1.0 to 5.0:1.0, more preferably from 1.1:1.0 to 3.0:1.0. Out of these polyurethane prepolymers, the essentially low-viscosity liquid ones can be used as such in the present invention, while the high-viscosity liquid ones or solid ones can be employed as a solution thereof dissolved in a suitable solvent or plasticizer. Such solvent includes esters such as ethyl acetate, butyl acetate and amyl acetate, ketones such as acetone, methyl ethyl ketone and methyl isobutyl ketone, aromatic hydrocarbons such as toluene, benzene and xylene, ethers such as tetrahydrofuran and dioxane, substituted acid amides such as N,N'-dimethylformamide and N,N'-dimethylacetamide, or dimethylsulfoxide, and so forth. By "polyisocyanate" which is a starting material of the above-mentioned prepolymer are denoted compounds having not less than two NCO groups in one molecule, and such compounds include, for example, 2,4- and 2,6-tolylene diisocyanates, m- and p-phenylene diisocyanates, 1-chlorophenylene-2,4-diisocyanate, m- and p-phenylene diisocyanates, 1-chlorophenylene-2,4-diisocyanate, 1,5-naphthalene diisocyanate, 3,3'-bis toluene-4,4'-diisocyanate, methylenebisphenylene-4,4'-diisocyanate, tetramethylene diisocyanate, hexamethylene diisocyanate, ω,ω'-diisocyanatodimethylbenzene, ω,ω'-diisocyanatodimethylcyclohexane, lysing diisocyanate, dicyclohexylmethane diisocyanate, tetramethylxylene diisocyanate, and dimers and trimers of these isocyanates, and triisocyanates obtained by addition of 3 moles of diisocyanates to triols such as trimethylolpropane, and so forth.

"Active hydrogen compound", which is other starting material, denotes polyols or polyamines having on the average 2 to 5 of active hydrogen groups per molecule and 30 to 3000 to the average molecular weight per active hydrogen group, or mixtures thereof, and as examples of such compounds, there may be mentioned:

(1) Low molecular weight diols or triols such as ethylene glycol, propylene glycol, 1,4-butanediol, hexamethylene glycol, 1,4-cyclohexanediol, triisopropanolamine, trimethylolpropane and glycerol, (2) Polyalkylene glycols, such as polyoxyethylene glycol, polyoxypropylene glycol, glycols of polyoxyethylene-polyoxypropylene copolymers and polyoxytetramethylene glycol, (3) Polymers from alkylene oxides such as ethylene oxide and propylene oxide with low-molecular-weight triols such as glycerine, trimethylolpropane and 1,2,6-hexanetriol or low-molecular-weight tetraols such as erythritol and pentaerythritol, (4) Polyester polyols from low molecular weight polyols and low molecular weight polycarboxylic acids, whereby suitable polyols include ethylene glycol, propylene glycol, 1,4- and 1,3-butanediols, 1,6-hexanediol, etc., and preferred polycarboxylic acids include adipic acid, succinic acid, maleic acid, phthalic acid, terephthalic acid, etc.

(5) Ring-opening polymerization products of cyclic esters such as polycaprolactone and polybutyrolactone, (6) Castor oil inclusive of hydrogenated castor oil such as mono or diricinoleate of mono, di- or triethylene glycol, mono-, di- or triricinoleate of 1,2,6-hexanetriol or trimethylolpropane and mono-, di-, tri- or tetraricinoleate of pentaerythritol or erythritol, and its related polyols as well as various esters and hemiesters of ricinoleic acid with polyhydric alcohols, and (7) Polyamines such as ethylenediamine, propylenediamine, tetramethylenediamine, p-phenylenediamine, 2,4-diaminotoluene, methylenebis-4,4'-diaminobenzene and 4,4'-methylene-bis-p-chloroaniline.

(8) Polybutadine compounds having hydroxyl groups at the terminals.

The reaction between the polyisocyanate compound and active hydrogen compound may be carried out in accordance with the per se known reaction conditions.

As the colloidal silica, use can be made of any type of commercially available one, and there may be mentioned, for example, Aerosil-200 ®, Aerosil-300 ®, R-812 ®, RX-200 ®, RY-200 ® and R-972 ® (all are produced by Nippon Aerosil of Japan).

The siloxane compound having a polyoxyethylene chain which is furthermore used in the present invention includes polysiloxanes or alkoxysilanes having not less than one polyoxyethylene chain in the molecule, and those having a molecular weight in the range of about 500 to 30,000 are preferable. The proportion in which the oxyethylene chain is contained in such siloxane compound is preferably in the range if 30 to 95 weight %, more preferably in the range of 40 to 90 weight %. The average degree of polymerization for one polyoxyethylene chain in the molecule is desirably within the range of 2 to 150, more desirably within the range of 5 to 60.

In the present invention, in addition, advantageous use can be made of siloxane compounds having a block copolymer chain of polyoxyethylene with other polyoxyalkylene. For example, a siloxane compound having a polyoxyethylenepolyoxypropylene block polymer chain in some instances conferes liquidity on the compounds, in contrast with a siloxane compound having merely a polyoxyethylene chain.

These siloxane compounds having polyoxyethylene chain can each be synthesized by per se known methods, such as the methods as described in Japanese Patent Publication Nos. 24731/64, 38264/71, 21754/71, 21754/76 and 8360/78, and Japanese Unexamined Patent Publication No. 134098/75.

Typical examples of the polysiloxane compound having polyoxyethylene chain, which is useful in the present invention, include compounds of the formula (I):

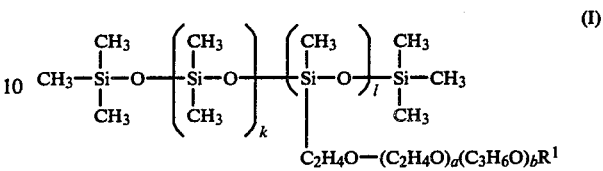

wherein "k" is an integer of 0 to 40; "l" is an integer of 2 to 50; a is an integer of 2 to 150; b is an integer of 0 to 20; $R^1$ is hydrogen or lower alkyl, compounds of the formula (II):

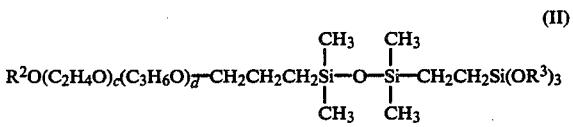

wherein "c" is an integer of 5 to 100; "d" is an integer of 0 to 20; $R^2$ is hydrogen or lower alkyl; $R^3$ is a lower alkyl group, and compounds of the formula (III)

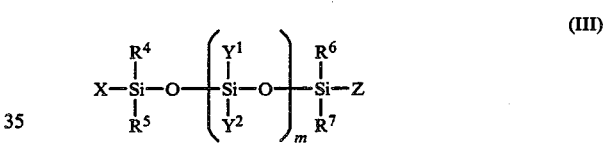

wherein $R^4$, $R^5$, $R^6$ and $R^7$ are the same or different and each is a methyl or phenyl group; "m" is an integer of 0 to 70; one of X and Z is a polyoxyalkylene containing a group represented by the formula:

(wherein "n" is an integer of 1 to 4; "g" is an integer of 0 to 50; "h" is an integer of 10 to 100; $R^8$ is hydrogen, an alkyl group of 1 to 8 carbon atoms or an alkylcarbonyl group of 1 to 18 carbon atoms, and when "g" is an integer of not less than 1, the $C_3H_6O$ and $C_2H_4O$ groups may be linked to each other in arbitrary orders), and the other is methyl, phenyl or a polyoxyalkylene containing group represented by the formula (i); $Y^1$ and $Y^2$ are the same or different, and each is methyl, phenyl or a polyoxyalkylene containing group represented by the formula (i) described hereinbefore, whereby in the case of m being not less than 2, $Y^1$ and $Y^2$ may vary per repeating unit within the scope as defined hereinbefore.

In the above formula (I), the group represented by $R^1$ is hydrogen or a lower alkyl having 1 to 4 carbon atoms, "k" is an integer of 0 to 40, preferably 0 to 25, "l" is an integer of 2 to 50, preferably 3 to 40, "a" is an integer of 2 to 150, preferably 5 to 60 and "b" is an integer of 0 to 20, preferably 0 to 5.

In the above formula (II), the groups represented by $R^2$ is hydrogen or a lower alkyl having 1 to 4 carbon atoms and $R^3$ is a lower alkyl having 1 to 4 carbon atoms, "c" is an integer of 5 to 100, preferably 10 to 60 and "d" is an integer of 0 to 20, preferably 0 to 5.

In the above formula (III) the group represented by $R^4$, $R^5$, $R^6$ and $R^7$ are methyl or phenyl group, preferably a methyl group and "m" is an integer of 0 to 70, preferably 10 to 30.

With reference to the group having a polyoxyalkylene chain of the formula (i) as represented by X, $Y^1$, $Y^2$ and Z, "n" is 1 to 4, preferably 2 or 3, and "g" is 0 to 50, more preferably 0 to 10, while "h" is 10 to 100, preferably 20 to 50. The alkyl of 1 to 8 carbon atoms represented by $R^8$ includes, for example, methyl, ethyl, propyl, butyl and pentyl, preferably methyl.

The alkylcarbonyl group of 1 to 18 carbon atoms represented likewise by $R^8$ includes acyl groups derived from saturated monocarboxylic acids of 1 to 18 carbon atoms, and the desirable examples are acetyl, propionyl and butyrol. When in the group represented by the formula (i), "g" is not less than 1, the individual oxypropylene group —$C_3H_6O$— and oxyethylene group —$C_2H_4O$— may be linked to each other in any orders, and it should be understood that the groups of the formula (i), irrespective of whether they may for example take the form of block copolymer or random copolymer containing such two unit groups, are to be included in the scope as defined above. It is desirable that the polyoxyalkylene-chain containing group of the formula (i) as represented by X, $Y^1$, $Y^2$ and Z is present in not less than at least 2 in the molecule of the polymer as represented by the general formula (I).

The proportion in which colloidal silica is incorporated into the composition of the present invention is preferably 0.5 to 50 parts by weight against 100 parts by weight of polyurethane prepolymer, particularly preferably 1.0 to 20 parts by weight.

The ratio of the siloxane compound having a polyoxyethylene chain to be used in the composition of the present invention is desirably 0.1 to 50 parts by weight against 100 parts by weight of colloidal silica, more desirably 1 to 20 parts by weight.

There may be added to the composition of the present invention, as the case may be, solvents such as toluene, xylene, ethyl acetate, methyl ethyl ketone and ligroin, inorganic fillers such as calcium carbonate, talc, clay and silica, pigments such as titanium oxide, phthalocyanine blue, iron oxide, chrome yellow, ultramarine blue and carbon, plasticizers used for urethanes such as dioctyl phthalate, dioctyl adipate, tricresyl phosphate and liquid petroleum resin, antioxidants, ultraviolet absorbers and a variety of catalyst for urethanes.

The thixotropy of the polyurethane resin composition to be obtained according to the present invention is in no way lowered even by the addition and milling of various solvents, plasticizers, inorganic fillers, pigments, UV absorbers, antioxidants and amine or organometallic catalysts conventionally used in the urethane industry. The resin composition according to the present invention, furthermore, does not exhibit any decreased thixotropy even after kneading in a three rall kneader, vaccum mixer, planetary mixer or butterfly mixer which are normally utilized for kneading. Especially, the resin composition comprising siloxane compounds of the formula (III) can restore its thixotropy quickly even after a high shear stress is applied to the said composition before use through, for example, stirring in a high speed mixer or refilling and packing by use of packing machine.

EXAMPLE 1

By reacting 639 parts by weight of polyoxypropylene glycol having a molecular weight of 2000, 213 parts by weight of polyoxypropylene triol having a molecular weight of 3000 with 148 parts by weight of a mixture of 2,4-tolylene diisocyanate and 2,6-tolylene diisocyanate (80:20) in a stream of nitrogen at 80° C. for 6 hours, there was obtained a polyurethane prepolymer having an isocyanate group content of 3.56%. The product was referred to as "Urethane Prepolymer (A)".

To 100 parts by weight of Polyurethane Prepolymer (A) as obtained above where added 5 parts by weight of colloidal silica (Aerosil 200 ®, produced by Nippon Aerosil Co., Ltd.) and 0.5 part by weight each of the thixotropy imparting agents A to I described in Table 1, and kneading was carried out with a vacuum kneader at 60° C. for 1 hour to yield a composition in the form of paste or grease, respectively. These compositions were subjected to slump test in accordance with JIS A-5758, whereby the results as shown in Table 1 were obtained.

TABLE 1

| Silane compound having a polyoxyethylene chain represented by the formula (I) | | | | | | | | |
|---|---|---|---|---|---|---|---|---|
| Sign of sample | k | l | a | b | $R^1$ | Average molecular weight | Average molecular weight of a polyoxyethylene chain | Content of polyoxyethylene chain (%) | Slump (m/m) |
| A | 10 | 5 | 17 | 0 | H | 5,164 | 748 | 72.4 | 0 |
| B | 10 | 5 | 10 | 0 | $CH_3$ | 3,705 | 440 | 59.4 | 0 |
| C | 25 | 5 | 10 | 0 | H | 4,735 | 440 | 46.5 | 0 |
| D | 0 | 40 | 10 | 0 | H | 21,928 | 440 | 80.3 | 0 |
| E | 5 | 3 | 10 | 0 | H | 2,165 | 440 | 61.0 | 0 |
| F | 10 | 5 | 34 | 0 | H | 8,904 | 1,500 | 84.2 | 0 |
| G | 10 | 5 | 57 | 0 | H | 13,964 | 2,500 | 89.5 | 0 |
| H | 10 | 5 | 34 | 3 | H | 9,774 | 1,500 | 76.7 | 0 |
| I | 5 | 3 | 17 | 2 | H | 3,437 | 748 | 65.3 | 0 |

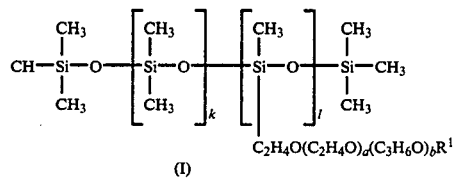

(I)

EXAMPLE 2

By reacting 590 parts by weight of polyoxypropylene glycol having a molecular weight of 3000, 295 parts by weight of polyoxypropylene triol having a molecular weight of 4500 with 115 parts by weight of 4,4'- diisocyanatodiphenylmethane in a stream of nitrogen at 80° C. for 4 hours, there was obtained a prepolymer having an isocyanate group content of 1.38%. The product was referred to as "Urethane Prepolymer (B)".

To 100 parts by weight of Prepolymer (B) as obtained in the above were added 60 parts by weight of dioctyl phthalate, 8 parts by weight of colloidal silica (Aerosil 200 ®, produced by Nippon Aerosil Co., Ltd.) and 0.8 part by weight each of the thixotropy imparting agents J to N described in Table 2 and kneading was carried out with a vacuum kneader at 60° C. for 1 hour to yield a composition in the form of paste or grease, respectively. These compositions were subjected to slump test in accordance with JIS A-5758, whereby the results as shown in Table 2 were obtained.

slump test in accordance with JIS A-5758, with the results being obtained as shown in Tables 3 and 4.

TABLE 3

| Polymer of the general formula (IIIa) | | | | | | | |
|---|---|---|---|---|---|---|---|
| Designation of the specimen | p | q | n | g | h | $R^8$ | Slump (m/m) |
| A | 0 | 2 | 1 | 20 | 20 | H | 0 |
| B | 10 | 0 | 3 | 5 | 40 | H | 0 |
| C | 20 | 8 | 1 | 50 | 100 | $CH_3$ | 0 |
| D | 15 | 2 | 3 | 0 | 30 | $CH_3$ | 0 |
| E | 30 | 5 | 4 | 2 | 10 | $CH_3$ | 0 |
| F | 50 | 4 | 3 | 10 | 30 | $C_4H_9$ | 0 |
| G | 20 | 1 | 3 | 6 | 20 | $COCH_3$ | 0 |

TABLE 2

| Silane compound having a polyoxyethylene chain represented by the formula (II) | | | | | | | |
|---|---|---|---|---|---|---|---|
| Sign of sample | c | d | $R^2$ | $R^3$ | Average molecular weight | Average molecular weight of a polyoxyethylene chain | Content of polyoxyethylene chain (%) | Slump (m/m) |
| J | 15 | 0 | H | $CH_3$ | 1,000 | 860 | 66.0 | 0 |
| K | 34 | 0 | $CH_3$ | $CH_3$ | 1,850 | 1,500 | 81.1 | 0 |
| L | 15 | 0 | H | $C_2H_5$ | 1,042 | 660 | 63.3 | 0 |
| M | 55 | 5 | $CH_3$ | $CH_3$ | 3,064 | 2,420 | 79.0 | 0 |
| N | 15 | 0 | $CH_3$ | $C_2H_5$ | 1,056 | 660 | 62.5 | 0 |

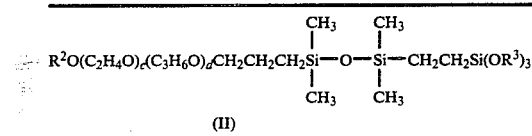

(II)

EXAMPLE 3

To 100 parts by weight of Prepolymer (B) as prepared in Example 2 were added 60 parts by weight of dioctyl adipate, 40 parts by weight of calcium carbonate (Escalon 200 ®, produced by Sankyo Seifun Co. of Japan), 9 parts by weight of titanium oxide (R-820 ®, produced by Ishihara Sangyo Kaisha of Japan), 8 parts by weight of colloidal silica (Aerosil 200 ®, produced by Nippon Aerosil), and 0.8 parts by weight each of the thixotropy imparting agents A to N, and stirring was effected in a vacuum kneader at 60° C. for 1 hour, respectively. The resultant compositions were subjected to slump test in accordance with JIS A-5758, whereby they all showed the satisfactory result of 0 mm in slump.

EXAMPLE 4

By allowing 639 parts by weight of polyoxypropylene glycol with a molecular weight of 2000, 213 parts by weight of polyoxypropylene triol with a molecular weight of 3000 and 148 parts by weight of a mixture of 2,4-tolylene diisocyanate and 2,6-tolylene diisocyanate (80:20) to react in a stream of nitrogen at 80° C. for 6 hours, there was obtained a urethane-prepolymer having an isocyanate group content of 3.56%. The prepolymer was called "urethane prepolymer (A)". To 100 parts by weight of the urethane prepolymer (A) as obtained in the above were added 5 parts by weight of colloidal silica (tradename of Aerosil 200, produced by Nippon Aerosil Co. of Japan) and 0.5 part by weight each of siloxane compounds A to H as described in Tables 3 and 4, followed by mixing with use of a vacuum kneader at 60° C. for 1 hour to give grease-formed compositions, respectively. These compositions were allowed to stand one day, then stirred in a high-speed mixer (1000 rpm) for 2 minutes and subjected to the $$X-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_p\left[\underset{\underset{Y^2}{|}}{\overset{\overset{CH_3}{|}}{Si}}-O\right]_q\underset{\underset{CH_3}{|}}{\overset{\overset{CH_3}{|}}{Si}}-Z \quad \text{(IIIa)}$$

(wherein X, $Y^2$ and Z each is $(CH_2)_n-O\{(C_3H_6O)_q(C_2H_4O)_h\}-R^8$)

TABLE 4

| Polymer of the general formula (IIIb) | | | | | | | |
|---|---|---|---|---|---|---|---|
| Designation of the specimen | p | q | n | a | b | $R^5$ | Slump (m/m) |
| H | 12 | 2 | 1 | 0 | 25 | $CH_3$ | 0 |

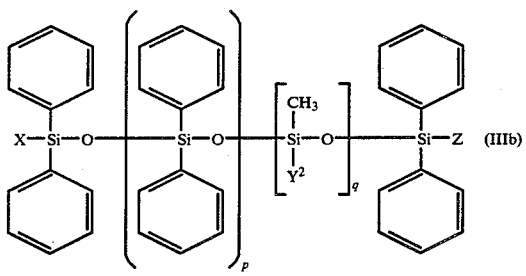

(wherein X, $Y^2$, and Z each is $-(C_2)_n-O\{C_3H_6O)_q(C_2H_4O)_n\}-R^5$)

EXAMPLE 5

By allowing 590 parts by weight of polyoxypropylene glycol with a molecular weight of 3000, 295 parts by weight of polyoxypropylene triol with a molecular weight of 4500 and 115 parts by weight of 4,4'-diphenylmethane diisocyanate to react in a stream of nitrogen at 80° C. for 4 hours, there was obtained a prepolymer having an isocyanate group content of 1.38%. This prepolymer was called "urethane preopolymer (B)".

To 100 parts by weight of the prepolymer (B) as obtained in the above were added 60 parts by weight of dioctyl phthalate, 8 parts by weight of colloidal silica (tradename of Aerosil 200, produced by Nippon Aerosil Co. of Japan) and 0.8 parts by weight of the siloxane compound represented by the formula (IIIc), followed by mixing in a vacuum kneader at 60° C. for 1 hour to give a grease-formed composition. The composition was allowed to stand one day, then stirred with a high-speed mixer (500 rpm) for 2 minutes and subjected to the slump test in accordance with JIS A-5758, with the result that the slump was 0 m/m.

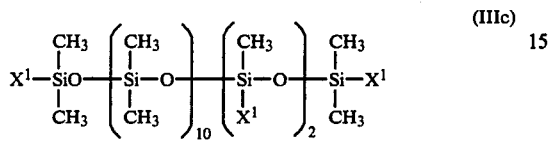

(wherein $X^1$ is $C_3H_6O(C_3H_6O)_5(C_2H_4O)_{30}-CH_3$).

EXAMPLE 6

To 100 parts by weight of the prepolymer (B) as prepared in Example 5 were added 60 parts by weight of dioctyl adipate, 40 parts by weight of calcium carbonate (Eskaron 200, produced by Sankyo Seifun Co. of Japan), 9 parts by weight of titanium oxide (R-820, produced by Ishihara Sangyo Kaisha Ltd. of Japan), 8 parts by weight of colloidal silica (Aerosil 200, produced by Nippon Aerosil Co. of Japan) and 0.8 part by weight each of the compounds B and D as shown in Table 1, followed by stirring in a vacuum kneader at 60° C. for 1 hour to give grease-formed compositions. The compositions were allowed to stand one day, then stirred with a high-speed mixer (800 rpm) for 2 minutes and subjected to the slump test in accordance with JIS A-5758, with the result that the slumps were 0 mm, respectively.

REFERENCE EXAMPLE 1

To 100 parts by weight of Prepolymer (B) as prepared in Example 2 were added 60 parts by weight of dioctyl adipate, 40 parts by weight of calcium carbonate (Escalon, produced by Sankyo Seifun Co. of Japan), 9 parts by weight of titanium oxide (R-820 ®, produced by Ishihara Sangyo Kaisha of Japan) and 8 parts by weight of colloids silica (Aerosil-200 ® produced by Nippon Aerosil Co., Ltd.), and kneading was carried out in a vacuum kneader at 60° C. for 1 hour. Furthermore, 0.8 part by weight of polyoxyethylene glycol (average molecular weight of 1000, produced by Sanyo Chemical Industries Ltd. of Japan) as a thixotropy imparting agent was added to the mixture, followed by kneading with a vacuum kneader. The samples taken after kneading for different periods of time of 5, 10 and 30 minutes after the addition of polyoxyethylene glycol were each subjected to slump test in accordance with JIS A-5758, whereby the samples being kneaded for 5 and 10 minutes showed the slump of 3 mm and 15 mm, respectively, while the sample kneaded for 30 minutes almost lost thixotropy and fell down.

REFERENCE EXAMPLE 2

To 100 parts by weight of Prepolymer (B) as prepared in Example 2 were added 60 parts by weight of dioxtyl adipate, 40 parts by weight of calcium carbonate (Escalon 200 ®, produced by Sankyo Seifun Co., Ltd. of Japan), 9 parts by weight of titanium oxide (R-820 ®, produced by Ishihara Sangyo Kaisha of Japan), 8 parts by weight of colloidal silica (Aerosil 200 ®, produced by Nippon Aerosil Co., Ltd.) and 3 parts by weight of polyoxyethylene glycol (average molecular weight of 20,000, produced by Wako Pure Chemicals Industries Ltd. of Japan) as well as 1 part by weight of alkyl-modified polysiloxane (SH-203 ®, produced by Toray Silicone Co., Ltd. of Japan), and stirring was effected in a vacuum kneader at 60° C. for 1 hour. The resultant composition was subjected to slump test in accordance with JIS A-5758, whereby it hardly showed thixotropy and fell down.

REFERENCE EXAMPLE 3

Using a polyoxyethylene glycol (with a molecular weight of 1,000) in place of the siloxane compound of the formula (IIIc) employed in Example 5, an experiment was carried out, with the result that the slump was 15 mm.

What is claimed is:

1. A thixotropic polyurethane resin composition which comprises
   (1) a polyurethane prepolymer in the form of liquid or solution,
   (2) colloidal silica and
   (3) a siloxane compound having a polyoxyethylene chain in the molecule and wherein the proportion of the colloidal silica per 100 parts by weight of the polyurethane prepolymer is 0.5 to 50 parts by weight and the proportion of the siloxane compound per 100 parts by weight of colloidal silica is 0.1 to 50 parts by weight.

2. The composition claimed in claim 1, wherein the proportion of the colloidal silica per 100 parts by weight of the polyurethane prepolymer is 1.0 to 20 parts by weight and the proportion of the siloxane compound per 100 parts by weight of colloidal silica is 1 to 20 parts by weight.

3. The composition claimed in claim 1, wherein a siloxane compound is one having polyoxyethylene chain in the proportion ranging from 40 to 90 weight percent per molecule.

4. The composition claimed in claim 1, wherein a siloxane compound is one represented by the formula (I):

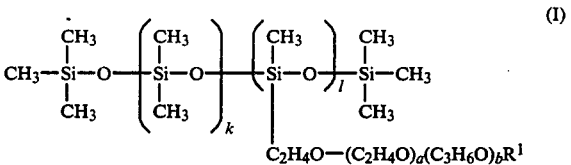

wherein "k" is an integer of 0 to 40; "l" is an integer of 2 to 50; "a" is an integer of 2 to 150; "b" is an integer of 0 to 20; R is hydrogen or lower alkyl.

5. A composition claimed in claim 1, wherein a siloxane compound is one represented by the formula (II):

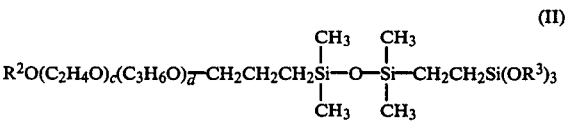

wherein "c" is an integer of 5 to 100; "d" is an integer of 0 to 20; $R^2$ is hydrogen or lower alkyl; $R^3$ is a lower alkyl group.

6. The composition claimed in claim 1, wherein a siloxane compound is one represented by the formula (III):

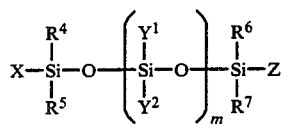  (III)

wherein $R^4$, $R^5$, $R^6$ and $R^7$ are the same or different and each is a methyl or phenyl group; "m" is an integer of 0 to 70; one of X and Z is a polyoxyalkylene containing a group represented by the formula:

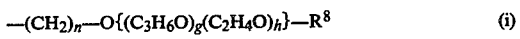  (i)

(wherein "n" is an integer of 1 to 4; "g" is an integer of 0 to 50; "h" is an integer of 10 to 100; $R^8$ is hydrogen, an alkyl group of 1 to 8 carbon atoms or an alkylcarbonyl group of 1 to 18 carbon atoms, and when a is an integer of not less than 1, the $C_3H_6O$ and $C_2H_4O$ groups may be linked to each other in arbitrary orders), and the other is methyl, phenyl or a polyoxyalkylene containing group represented by the formula (i); $Y^1$ and $Y^2$ are the same or different, and each is methyl, phenyl or a polyoxyalkylene containing group represented by the formula (i) described hereinbefore, whereby in the case of m being not less than 2, $Y^1$ and $Y^2$ may vary per repeating unit within the scope as defined hereinbefore.

* * * * *